(12) United States Patent
Momosaki

(10) Patent No.: US 6,499,223 B2
(45) Date of Patent: Dec. 31, 2002

(54) CORNER RULER

(75) Inventor: Mitsukazu Momosaki, Fukuoka (JP)

(73) Assignee: Alpha Professional Tools, Wyckoff, NJ (US)

( * ) Notice: Subject to any disclaimer, the term of this patent is extended or adjusted under 35 U.S.C. 154(b) by 0 days.

(21) Appl. No.: 09/768,017

(22) Filed: Jan. 23, 2001

(65) Prior Publication Data

US 2002/0095809 A1 Jul. 25, 2002

(51) Int. Cl.[7] .................................................. G01B 3/14
(52) U.S. Cl. ........................................... 33/562; 33/566
(58) Field of Search ........................ 33/562, 563, 566, 33/666, 677, 679, 18.1, 27.01, 32.2, 42

(56) References Cited

U.S. PATENT DOCUMENTS

| | | | | |
|---|---|---|---|---|
| 4,382,590 A | * | 5/1983 | Pandya et al. ............. | 269/87.2 |
| 4,739,558 A | * | 4/1988 | Black ............................ | 33/42 |
| 5,615,485 A | * | 4/1997 | Stoneberg .................. | 33/27.03 |
| 5,946,999 A | * | 9/1999 | Kahn ........................... | 83/879 |

FOREIGN PATENT DOCUMENTS

JP    H10-214131    1/2000

* cited by examiner

*Primary Examiner*—Diego Gutierrez
*Assistant Examiner*—Gail Verbitsky
(74) *Attorney, Agent, or Firm*—Weingram & Associates, P.C.

(57) ABSTRACT

A ruler main body is formed by attaching the respective interlayer plates to both surfaces of a center plate, a ruler section is formed at the corners of the ruler main body, a position determining plate is established which extends from the center plate along two sides of the ruler main body which lies between the ruler section and projects beyond the surface of the ruler main body, and position determination is performed by abutting the position determining plate to two edges which the corner of the object to be cut lies between.

9 Claims, 3 Drawing Sheets

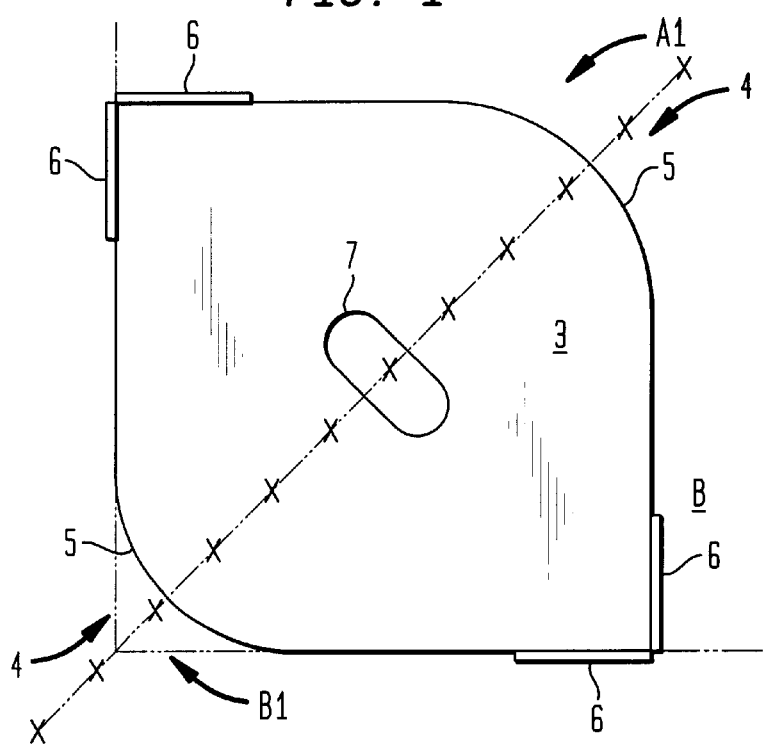
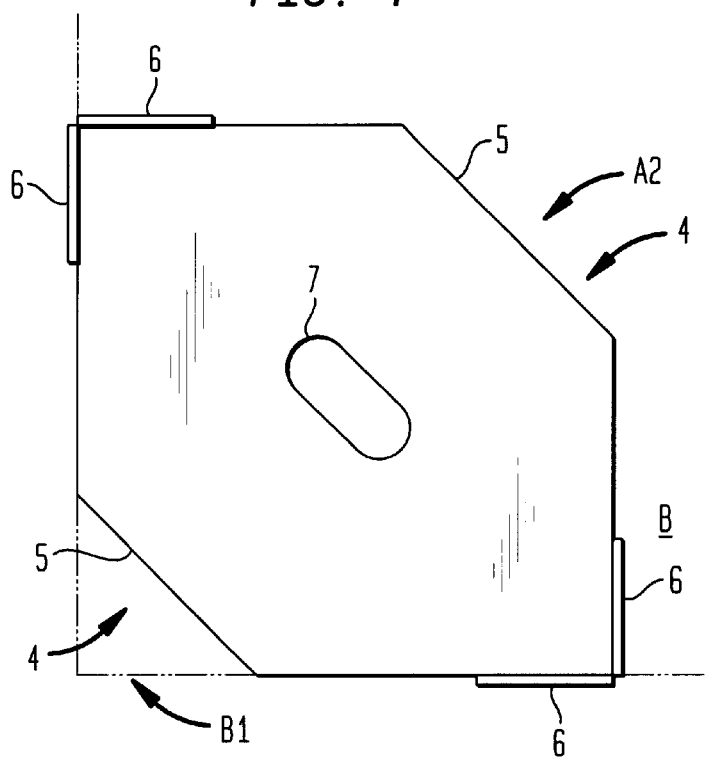

CORNER RULER

BACKGROUND OF THE INVENTION

This invention pertains to corner rulers.

Previously, a corner section of objects to be cut of things like plate glass were cut, and a marked line of a desired shape was formed on the corner section while guiding a tool, such as a glass cutter, by an item such as a compass or ruler, when treating corner cuts at a 45 degree straight line.

However, there was the problem that position determination required skill, as being done without a stable compass or ruler was difficult since a plate glass surface is easily cracked.

SUMMARY OF THE INVENTION

Therefore, the present invention includes a corner ruler that is characterized by a ruler main body being formed with respective interlayer plates attached to both surfaces of a center plate, a ruler section being formed at a corner section of the same ruler main body, a position determining plate being established which extends from a center plate as situated on two sides of a ruler main body which the same ruler section lies between, a front end wire of the same position determining plate projecting beyond the surface of a ruler main body, and position determination being performed by abutting the same position determining plate to an end wire of two sides which a corner of the object to be cut lies between.

There are also the following features.

The above-mentioned ruler main body is formed in a substantially rectangular shape, and the respective ruler sections are formed at the corner sections which are located on a diagonal line of the above-mentioned rectangular shape.

The above-mentioned ruler section is an almost ¼ arc shape.

The above-mentioned ruler section has straight lines that intersect at almost 45 degrees with adjacent position determining plates.

BRIEF DESCRIPTION OF THE DRAWINGS

FIG. 1 is a plan view of a corner ruler pertaining to a first embodiment of this invention.

FIG 4 is a plan view of a corner ruler pertaining to a second embodiment of the invention.

DETAILED DESCRIPTION OF THE PREFERRED EMBODIMENTS

Embodiments of this invention are as follows.

The ruler main body is formed by attaching respective interlayer plates to both surfaces of a center plate of an almost square shape, a corner section which is on a diagonal line of the same ruler main body as a ruler section is formed in a desired shape which shapes a plate glass corner section, a guide wire section extends from the periphery of a center plate that contacts the above-mentioned respective corner sections in the direction of the right angle in the respective same direction; further, position determination of the corner ruler is performed by abutting the two peripheries that are adjacent to the plate glass corner section, a glass cutter is run along the ruler section, and plate glass can be cut in the desired shape.

The embodiments of this invention are described by referring to the Figures.

Figure 2:
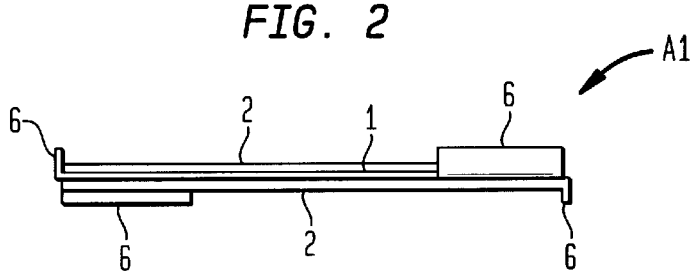
FIG. 2 is a lateral view thereof.
Figure 3:
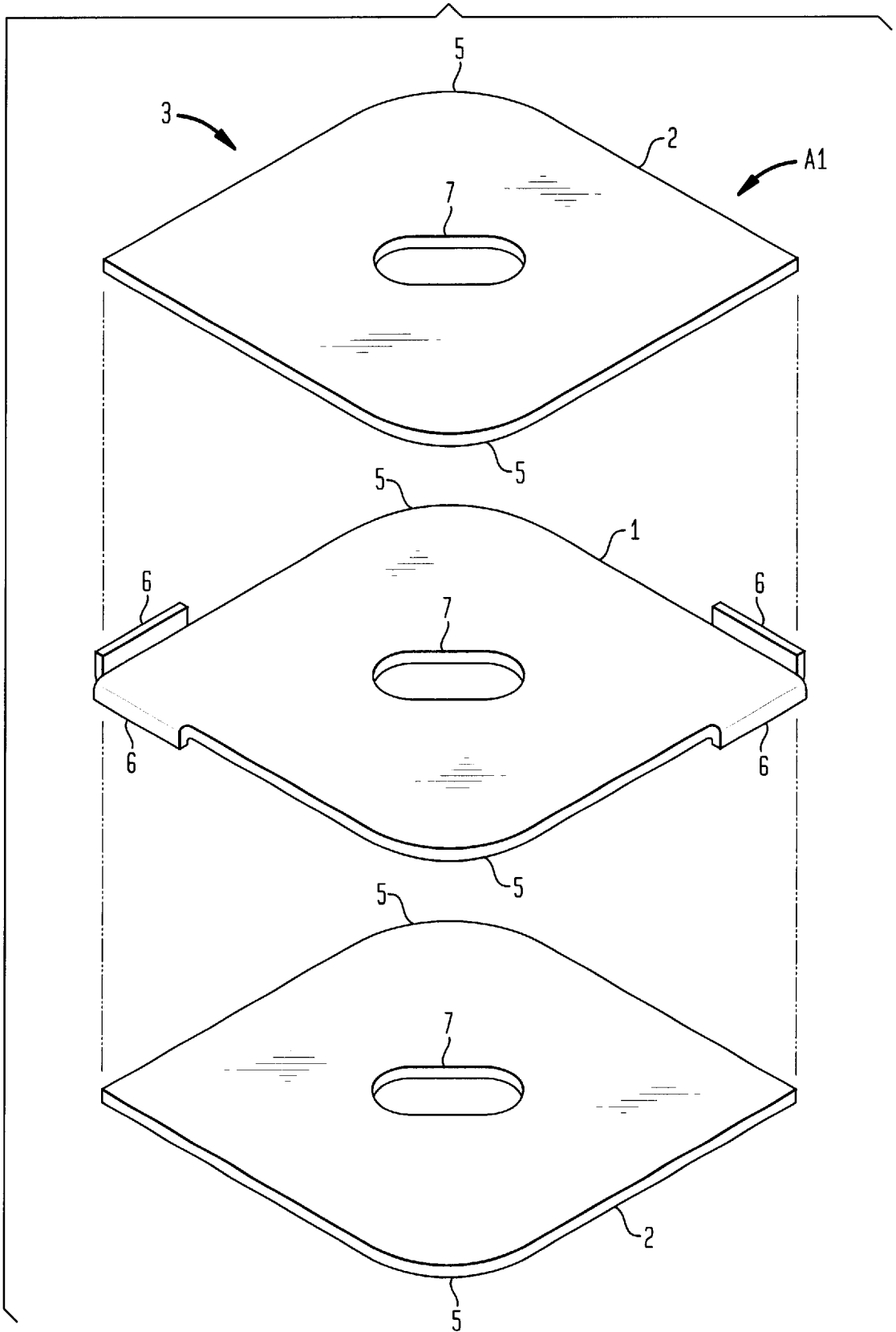
FIG. 3 is a development tilted view which shows a construction of the corner ruler of the first embodiment.

FIGS. 1–3 show a first embodiment of the corner ruler A1 pertaining to this invention. The corner ruler A1 is a ruler that is used when forming a plate glass B corner section B1 into an almost ¼ arc shape with a desired radius. The ruler main body 3 is formed by attaching interlayer plates 2, 2 of a thicknesses of approximately 2 mm formed from composite resin plates on both surfaces of the center plate 1 of an almost square shape that is formed from a metal plate of for example stainless steel with a thickness of approximately 1 mm. Substantially ¼ arc shapes are formed in varying radiuses with the corner sections 4,4 that are on the diagonal line of the same ruler main body 3 as the respective ruler sections 5, 5.

Further, the periphery that is adjacent to the respective ruler sections 5,5 of the center plate 1 extends beyond that by a respective width of approximately 7 mm, and position determining plates 6, 6, 6, 6 are formed by bending this extended section in a right angle.

Among the above-mentioned position determining plates 6, 6, 6, 6, the position determining plates 6, 6 that are adjacent to one side of the ruler section 5a are bent upward. That upper edge projects upward only approximately 4 mm from the upper surface of the ruler main body 3 while the position determining plates 6,6 which are adjacent to the ruler section 5b of the other side are bent downward, and the upper edges project downward only approximately 4 mm from the bottom surface of the ruler main body 3. Further, a finger hole 7 is established in the center section of the ruler main body 3.

The first embodiment of this invention is constructed as above-mentioned. The corner ruler A1 position is determined by stopping position determining plate 6, 6 which is adjacent to the ruler section 5 that has a desirable radius on the periphery of plate glass B corner section B1 when there is plate glass B corner section treatment. Corner ruler A1 is set on plate glass B using finger hole 7. A glass cutter is slid along ruler section 5 in this condition, a marked line in an almost ¼ arc shape can be formed on the surface of corner section B1, and the plate glass B can be cut along this marked line.

In particular, the position of corner ruler A1 can be exactly determined by the simple operation of stopping the position determining plates 6, 6 at the periphery of the plate glass B. Further, an accurate marked line can be sketched by preventing the slipping of the corner ruler A1, since the force when pushing on ruler section 5 by a glass cutting is supported by the position determining plate 6, 6 and the plate glass B periphery abutting when a marked line is drawn by the glass cutter.

Further, accurate position determination of corner ruler A1 can be determined without touching the cut glass B edge on the curved surface inside the bent section between the center plate 1 and the position determining plate 6 since interlayer plates 2, 2 are attached to both surfaces of the center plate 1.

However, the edges. thus cut are sharply set in the plate glass B, as a general material, and the above-mentioned edges contact the aforementioned curved surface when determining the position of corner ruler A1 when there are no interlayer plates 2, 2, and the position determination of corner ruler A1 has errors with inaccuracies due to that by an abutment of the plate glass B edge and the position determining plates 6, 6 being unstable.

Figure 5:
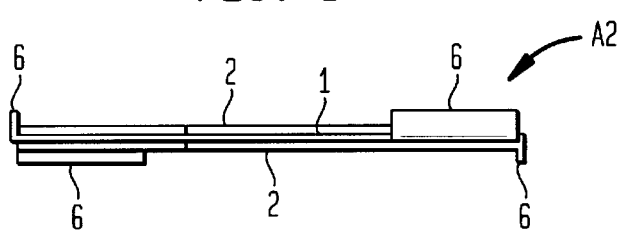
FIG. 5 is a lateral view thereof.

FIGS. 4 and 5 show a second embodiment of a corner ruler A2 of the invention. This corner ruler A2 cuts plate glass B corner section B1 linearly at a 45 degree angle, the ruler sections 5, 5 only differ with the first embodiment while the ruler main body 3 and position determining plates 6, 6, 6, 6 are of similar construction as the first embodiment.

The ruler section 5, 5 has the corner sections which are on the diagonal lines of ruler main body 3 of an almost square shape formed in a straight line that intersects at a 45 degree angle with the side that contacts the same corner.

The position of the corner ruler A2 is determined by stopping the position determining plates 6, 6 that are adjacent to the ruler section 5 of the desired size on the periphery of plate glass B corner section B1 in the same way as a corner ruler A1 of the first embodiment. The corner ruler A2 is set on the plate glass B using finger hole 7, a glass cutter slides along ruler section 5 in this condition, a 45 degree marked line can be formed diagonal to the surface of corner section B1 and the position of corner ruler A2 can be accurately determined by this embodiment, also. Further, an accurate marked line can be sketched by stopping slipping of corner ruler A2 since the force with which the glass cutter presses down on ruler section 5 is supported by position determining plates 6, 6 and plate glass B periphery abutting when sketching a marked line by a glass cutter.

Figure 6:
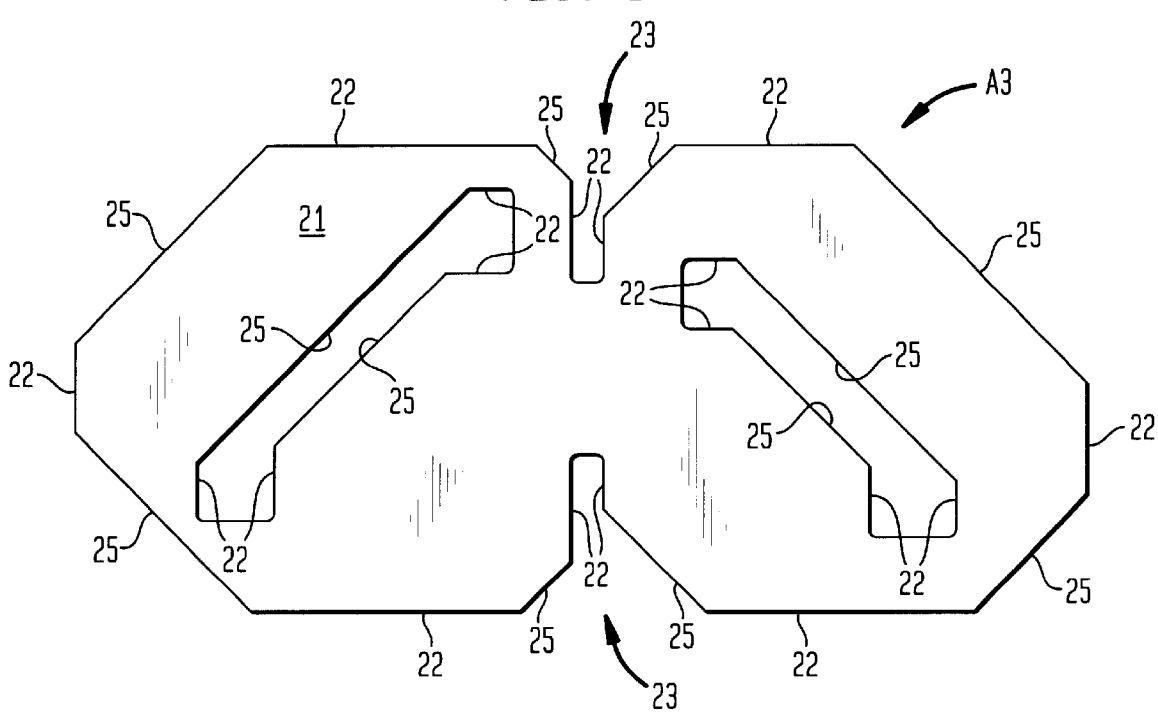
FIG. 6 is a plan view of a corner ruler pertaining to a third embodiment of the invention.

FIG. 6 shows a third embodiment of a corner ruler A3 of the invention, with various forms of a ruler section 25 for linear corner cutting of the plate glass B corner section B1 at 45 degree angles. The ruler A3 is formed from composite resin plate 21 of a thickness of approximately 4 mm, the length of the two sides of the isosceles triangle of a section that is cutout from plate glass B establishes a ruler section 25 of eleven units such as being formed for every 5 mm from 10 mm to 60 mm, and the ruler section 25 is formed with twelve units for measure by adding to this ruler sections 25 of 70 mm.

The formation of corner ruler A3 slender rectangular cuts 23, 23 that cross the respective length-wise directions on the almost central sections of the two long sides of the almost rectangular shape composite resin plate 21 are formed as the shape of a corner ruler A3 with eight corner sections formed and the side that lies between the respective corner sections as the position determining section 22 to respective plate glass B corner section B1; and, the respective two ruler sections 25 and the four position determining sections 22 are formed at the inner section of the composite resin plate 21 which is partitioned in two parts.

This embodiment requires little difficulty for position determination of corner ruler A3, since a position determining plate such as that of the aforementioned first and second embodiments is not established, but one corner ruler A3 can be used for forms of corner section B1 of various sizes since twelve ruler sections 25 are formed.

Further, plate glass corner section treatment when cutting a plate glass corner section with a glass cutter as directly guided by a corner ruler is explained, but the object to be cut in this invention is not limited to plate glass. When there is a corner formed in an almost right angle, the invention can be utilized; the cutting line which is formed as the objective of a corner section cutting operation can be accurately and easily sketched with a corner ruler of this invention, when there are glass type mirrors, of course, and, for example, objects to be cut such as (bathroom) tile, plywood, and steel plates.

The embodiments of the invention provide the following advantages.

The invention of claim 1 has a ruler main body formed by attaching respective interlayer plates on both surfaces of a center plate, a ruler section formed at a corner section of the same ruler main body, a position determining plate that extends from the center section along 2 sides of the ruler main body that lies between the same ruler section beyond the surface of the ruler main body, and corner shaping operations can be simply done by directly guiding a tool such as a class cutter accurately and easily by position determination of a corner ruler by position determination being performed by abutting the same position determining plate at 2 sides of the edges where the corner of an object to be cut lies between.

The invention of claim 2 has the above-mentioned ruler main body formed in an almost rectangular shape, and one corner ruler can correspond to two types of corner sections of differing sizes due to the respective ruler sections being formed at the corner sections which are located on a diagonal line of the above-mentioned almost rectangular shape.

The invention of claim 3 can easily form a corner section with a cut (shape) maintained, since the above-mentioned ruler section is an almost ¼ arc shape.

The invention of claim 4 can easily form the shape of a corner since it is linear with the above-mentioned ruler section intersecting the adjacent position determining plate at almost 45 degrees.

Explanation of the Symbols

A1,A2-corner ruler.
B-object to be cut.
1-center plate.
2-interlayer plates.
3-ruler main body.
5-ruler section.
6-position determining plate.

It will be understood that the embodiments described herein are merely exemplary and that a person skilled in the art may make many variations and modifications without departing from the sphere and scope of the invention. All such variations and modifications are intended to be included in the scope of the invention as defined in the appended claims.

What is claimed is:

1. A corner ruler comprising a ruler main body, including a center plate, a pair of interlayer plates secured on opposite surfaces of said center plate, a pair of ruler sections formed at opposite corner sections of said ruler main body, a pair of position determining plates extending from said center plate along opposite sides of said ruler main body which the ruler section lies between, the position determining plates having edges projecting beyond said ruler main body, and position determination being determined by the position determining plates abutting the edges of the two sides which the corner of an object to be cut lies between.

2. A corner ruler according to claim 1, that is characterized by the ruler main body being shaped in a substantially rectangular shape and the respective ruler sections being formed on corner sections that are positioned on a diagonal line of the substantially rectangular shape.

3. A corner ruler according to claim 1, wherein the ruler section is an almost ¼ arc shape.

4. A corner ruler according to claim 2, wherein the ruler section is an almost ¼ arc shape.

5. A corner ruler according to claim 1, that is characterized by the ruler section having straight lines that intersect at an almost 45 degree angle with adjacent position determining plate.

6. A corner ruler according to claim 2, that is characterized by the ruler section having straight lines that intersect at an almost 45 degree angle with adjacent position determining plate.

7. A corner ruler comprising a ruler main body, including a center plate, an interlayer plate secured on a surface of said center plate, a pair of ruler sections formed at opposite corner sections of said ruler main body, a pair of position determining plates extending from said center plate along opposite sides of said ruler main body which the ruler section lies between, the position determining plates having edges projecting beyond said ruler main body, and position determination being determined by the position determining plates abutting the edges of the two sides which the corner of an object to be cut lies between.

8. A corner ruler according to claim 7, that is characterized by the ruler main body being shaped in a substantially rectangular shape and the respective ruler sections being formed on corner sections that are positioned on a diagonal line of the substantially rectangular shape.

9. A corner ruler according to claim 7, wherein the ruler section is an arcuate shape.

* * * * *